(12) United States Patent
Wilson et al.

(10) Patent No.: US 6,206,182 B1
(45) Date of Patent: Mar. 27, 2001

(54) CO-INJECTED LABYRINTH AND CONTACT SEAL FOR AN IDLER ROLLER ASSEMBLY FOR A BELT CONVEYOR BACKGROUND OF THE INVENTION

(75) Inventors: Craig M. Wilson, Wexford; James D. Knapick, Saxonburg, both of PA (US)

(73) Assignee: CWA, Inc., Wexford, PA (US)

( * ) Notice: Subject to any disclaimer, the term of this patent is extended or adjusted under 35 U.S.C. 154(b) by 0 days.

(21) Appl. No.: 09/239,180

(22) Filed: Jan. 29, 1999

(51) Int. Cl.[7] .................................................. B65G 39/10
(52) U.S. Cl. .......................................... 198/842; 198/501
(58) Field of Search .................................. 198/842, 501, 198/500, 830

(56) References Cited

U.S. PATENT DOCUMENTS

| | | |
|---|---|---|
| 3,984,160 | 10/1976 | Sheldon et al. . |
| 4,277,114 | 7/1981 | Lindegger . |
| 4,379,600 | 4/1983 | Muller . |
| 4,919,253 | 4/1990 | Morrison . |
| 4,972,939 * | 11/1990 | Uttke et al. ............................. 198/501 |
| 5,025,917 * | 6/1991 | Smith et al. ........................... 198/842 |
| 5,028,054 | 7/1991 | Peach . |
| 5,046,869 * | 9/1991 | Roberts et al. ....................... 384/537 |
| 5,074,408 * | 12/1991 | Smith et al. ........................... 198/842 |
| 5,188,214 | 2/1993 | Uttke et al. . |
| 5,188,514 * | 2/1993 | Uttke et al. ............................. 198/501 |
| 5,261,528 * | 11/1993 | Bouchal ................................ 198/842 |
| 5,381,887 * | 1/1995 | Emmons .............................. 198/830 |
| 5,383,549 * | 1/1995 | Mayer .................................. 198/842 |
| 5,421,442 * | 6/1995 | Agnoff ................................... 193/37 |
| 5,433,308 * | 7/1995 | Gagnon ................................. 193/37 |
| 5,857,554 * | 1/1999 | Toye .................................. 193/35 R |
| 5,996,542 * | 6/1998 | Bathurst ............................ 123/90.37 |
| 6,082,528 * | 7/2000 | Habberley ........................... 198/842 |
| 6,095,320 * | 8/1998 | DeMong et al. ..................... 198/812 |
| 6,109,427 * | 8/2000 | Hosch et al. ......................... 198/835 |
| 6,113,059 * | 9/2000 | Couillard ............................. 248/694 |

* cited by examiner

*Primary Examiner*—Christopher P. Ellis
*Assistant Examiner*—Rashmi Sharma
(74) *Attorney, Agent, or Firm*—Arnold B. Silverman; Eckert Seamans Cherin & Mellott, LLC

(57) ABSTRACT

An idler roller assembly for a belt conveyor includes a fixed shaft, a roller mounted for rotation about the shaft, and a housing mounted in each end of the roller for rotation therewith. The shaft has a hub portion adjacent each end which hub portion is disposed adjacent the housing. A bearing has an inner race secured to the shaft and an outer race secured to the housing. A unitary co-injected annular seal having a first labyrinth seal portion and a contact seal portion composed of a different material than the first labyrinth seal portion is provided between the bearing and hub portions. The contact seal portion is preferably resiliently deformable and is less rigid than the first labyrinth seal portion. A second labyrinth seal portion cooperates with the first labyrinth seal portion to define a labyrinth passageway which is sealed by the contact seal.

23 Claims, 12 Drawing Sheets

CO-INJECTED LABYRINTH AND CONTACT SEAL FOR AN IDLER ROLLER ASSEMBLY FOR A BELT CONVEYOR BACKGROUND OF THE INVENTION

BACKGROUND OF THE INVENTION

1. Field of the Invention

The present invention relates to a roller assembly for a belt conveyor and, more specifically, it provides a unitary co-injected annular seal which has a first labyrinth seal portion and a contact seal portion composed of a different material.

2. Description of the Prior Art

In connection with belt conveyors as used in mining and other industries, it has been known to provide a fixed shaft having an idler roller rotatably mounted with respect thereto and an interposed bearing which facilitates the relative rotation. See, generally, U.S. Pat. Nos. 3,984,160, 4,972, 939, 5,188,214, 5,261,528, and 5,383,549.

It has also been known to provide labyrinth seals in idler rollers for conveyors. See, generally, U.S. Pat. Nos. 4,277, 114, 4,919,253, 5,028,054 and 5,046,869.

U.S. Pat. Nos. 5,025,917 and 5,074,408 disclose conveyor roller tubes for belt conveyors which have a bearing interposed between the housing and end cover, a labyrinth seal, and a separate additional seal element disposed adjacent to the bearing.

U.S. Pat. No. 4,379,600 discloses a journal bearing with a dust seal wherein a deformable sealing ring in the form of a separate lip member is provided adjacent to a labyrinth seal and has one end received within a preformed groove.

U.S. Pat. No. 4,919,253 discloses a bearing lubrication system for an idler roller assembly for conveyors wherein a labyrinth seal, a bearing, and a felt seal are provided. See, also, U.S. Pat. Nos. 4,972,939, 5,188,214 and 5,261,528.

In spite of the foregoing known systems, there remains a need for an idler roller seal wherein the advantageous use of co-injection may be employed to provide a labyrinth seal of a first material integrally formed with a wiper or contact seal composed of a more flexible material which may be employed in an otherwise conventional idler roller construction.

SUMMARY OF THE INVENTION

The present invention has met the above-described need by providing an idler roller assembly for a belt conveyor wherein a fixed shaft is operatively associated with a roller mounted for rotation about the shaft. A housing mounted at an end of the roller for rotation therewith cooperates with a hub secured at or adjacent an end of the shaft. A bearing has an inner race secured to the shaft and an outer race secured to the housing. A unitary co-injected annular seal has a first labyrinth seal portion and a contact seal portion composed of a different material than the first labyrinth seal portion. A second labyrinth seal portion cooperates with the first labyrinth seal portion to provide a labyrinth seal. The contact seal portion is preferably made from a resiliently deformable material which may be positioned at an annular radially outwardly disposed portion of the first labyrinth seal or a radially inwardly disposed portion thereof.

Various configurations of the contact seal and its cooperation with different portions of the adjacent hub may be employed.

In general, the idler roller will have housings and hubs along with the associated bearings and the co-injected seal of the present invention at each end.

It is an object of the present invention to provide an idler roller assembly for a belt conveyor wherein a unitary co-injected annular seal provides the desired structure and properties in a first labyrinth seal portion and a contact seal portion composed of a different material than the first labyrinth seal portion.

It is another object of the present invention to provide such a roller assembly construction wherein the first labyrinth seal portion is composed of a more rigid material than the contact seal portion.

It is yet another object of the present invention to provide a unitary seal which is in part a labyrinth seal portion and a resiliently deformable contact seal portion.

It is a further object of the present invention to provide such a unitary seal construction which is adapted to be employed with conventional idler roller assemblies.

It is a further object of the present invention to provide such a co-injected seal construction wherein various configurations of the contact seal portion may be employed so as to enhance desired properties in the idler roller assembly.

It is a further object of the present invention to provide such an idler roller which facilitates equalizing the grease pressure in the labyrinth to provide for more efficient operation.

It is a further object of the present invention to provide a first labyrinth seal and a resiliently deformable contact seal which resists ingress of contaminants.

It is a further object of the present invention to provide a first labyrinth seal and a resiliently deformable contact seal which allows for the purging of contaminants, when it is desirable, by means of grease flowing to the outside of the seal through the labyrinth and contact seal portions.

These and other objects of the invention will be more fully understood from the following description of the invention on reference to the illustrations appended hereto.

DESCRIPTION OF THE PREFERRED EMBODIMENT

As employed herein, the term "co-injected" refers to the creation of a unitary annular seal through molding of at least two different materials to create a unitary structure having portions composed of at least two different materials and shall expressly include, but not be limited to co-injection molding, 2-shot molding and insert molding.

As is known to those skilled in the art, the co-injection molding process is the injection of two different materials through one nozzle into one mold. The 2-shot molding process is the injection of two different materials through two nozzles into one mold which can rotate to allow both materials to fill different areas of the same mold. The insert molding process is the molding of one part in two different molds with two different materials. The first molded part is inserted into the second mold and the second material is molded to the first part. These methods may be adapted to be employed with more than two materials, if desired.

Figure 1:
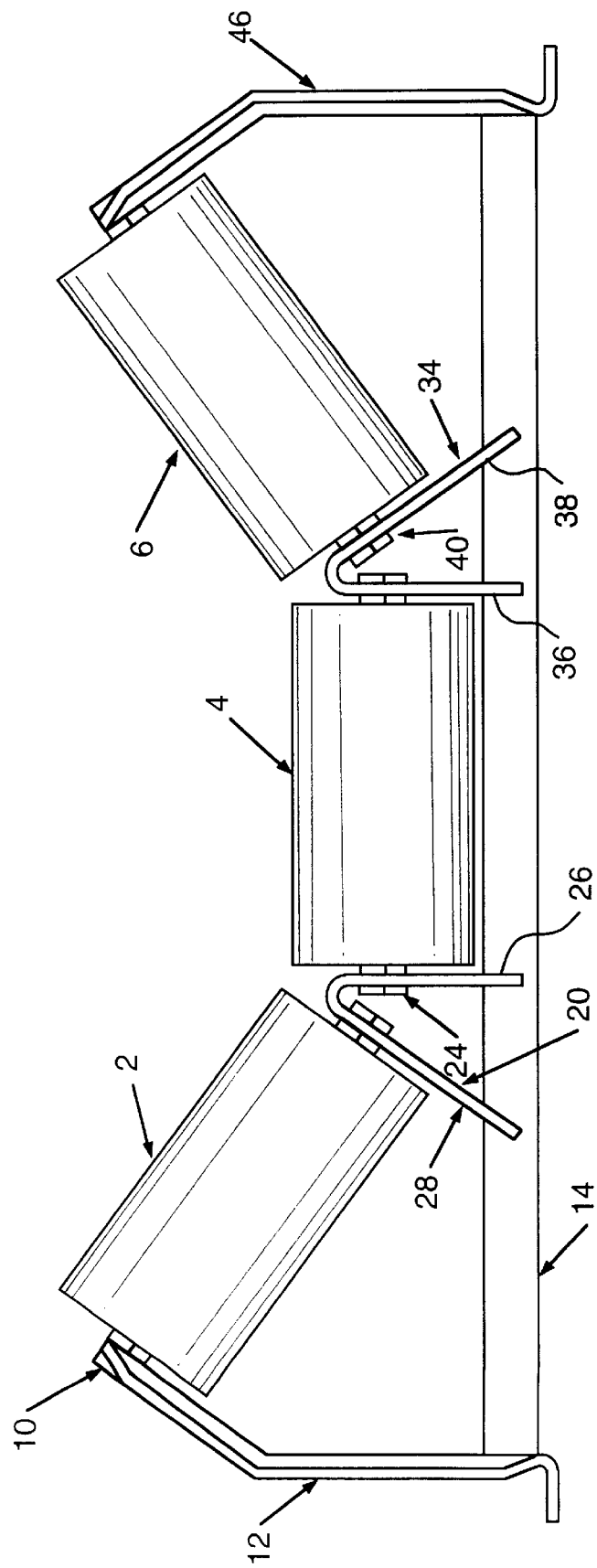
FIG. 1 is a partially schematic elevational view showing three conveyor roller members disposed in a wing-like orientation.

Referring to FIG. 1 in greater detail, an example of a group of idler rollers 2, 4, 6 mounted in general wing-like configuration with rollers 2 and 6 being angularly outwardly and upwardly oriented and roller 4 being generally horizontally oriented. Each would be adapted to support belts of a belt conveyor in a trough conveyor system. It will be appreciated that the invention is not limited to the use of multiple rollers or to this particular relative arrangement of rollers 2, 4, 6. In the form shown, idler roller 2 has a fixed shaft 10 which is supported by support member 12 which is, in turn, secured to a suitable base member 14. The opposite end of shaft 10 is fixedly secured to support member 20 which also supports an end of shaft 24 and has a leg 26 secured to base 14 along with leg 28. Similarly, roller 4 has the opposite end of fixed shaft 24 secured to support member 34 which has legs 36 secured to an end of shaft 24 and leg 38 secured to an end of shaft 40 of roller 6. Legs 34, 36 are secured to roller support member 14 by any conventional means. End support 46 is fixedly secured to shaft 40 and to support base 14.

In a conventional manner, the outer rollers of idler rollers 2, 4, 6 will be mounted for axial rotation about the fixed shafts 10, 24, 40, respectively.

Figure 2:
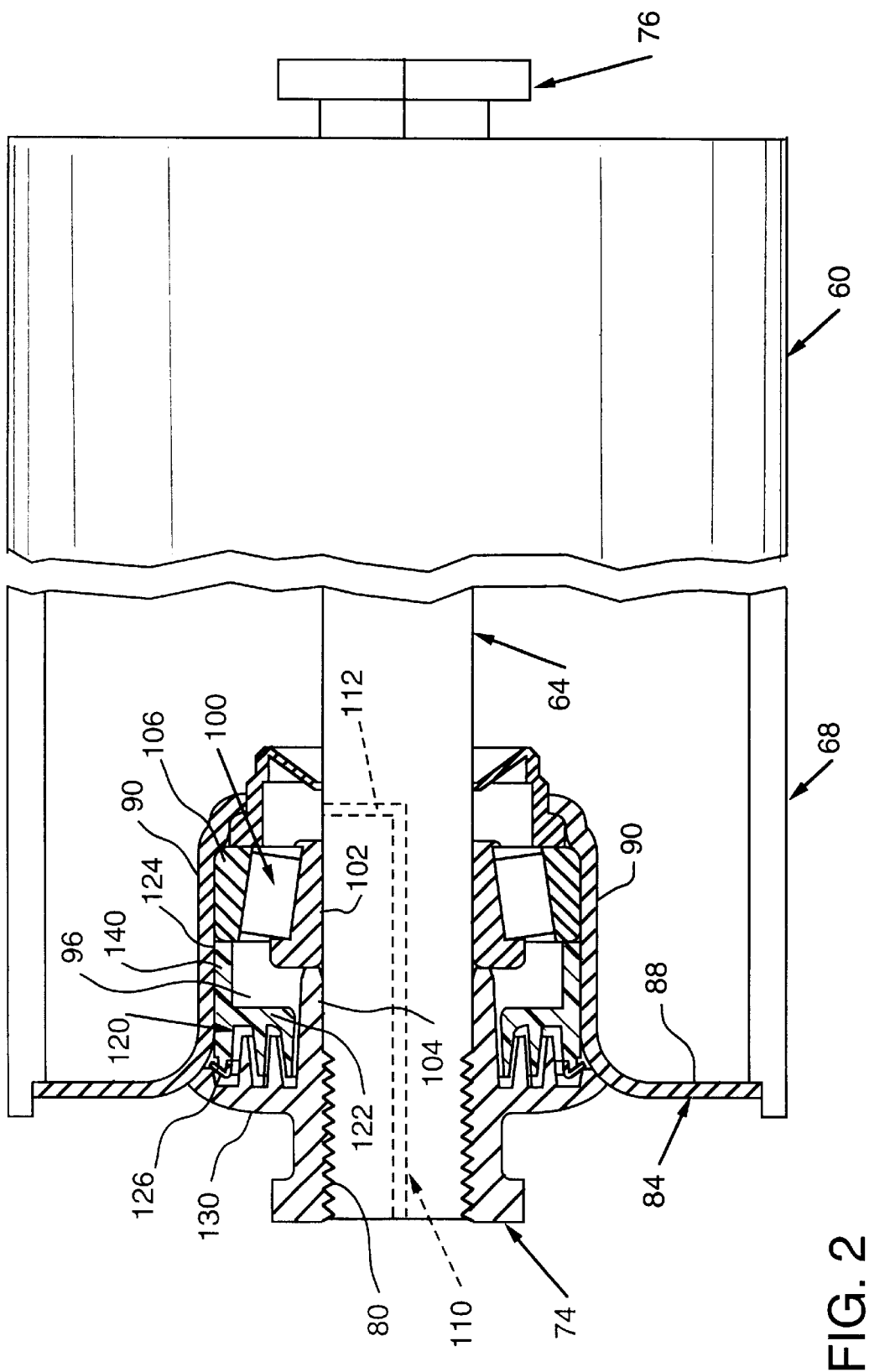
FIG. 2 is a fragmented view partially in cross-section showing details of an end portion of an idler roller of the present invention.
Figure 3:
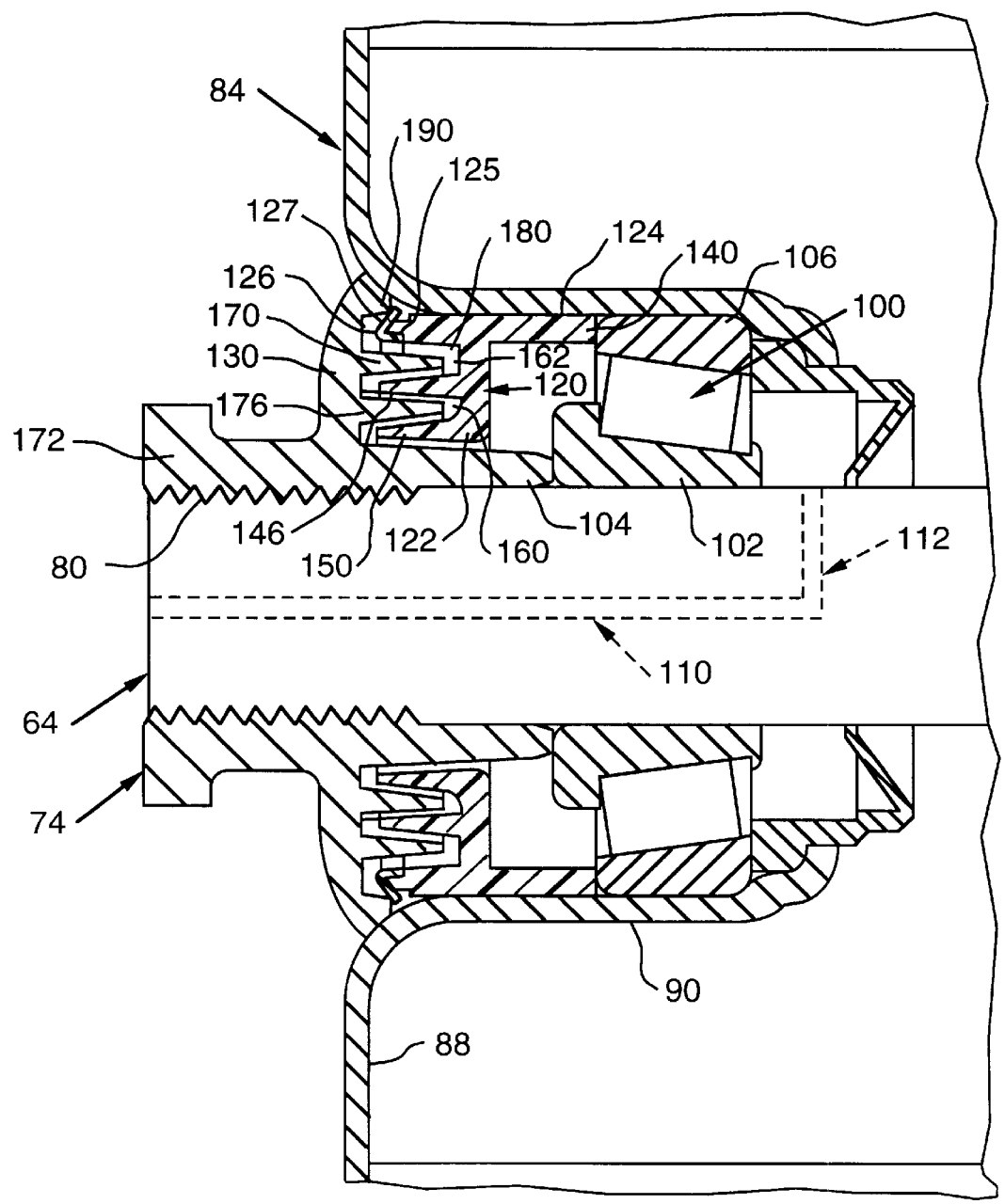
FIG. 3 is a cross-sectional illustration showing an enlarged form the end portion of FIG. 2.

Referring to FIGS. 2 and 3 which shows in segmented form an idler roller 60 having a fixed shaft 64 about which the roller 68 is concentrically mounted for rotation thereabout. While each end preferably will have the identical construction, for convenience of disclosure herein, a single end will be discussed. It being understood that preferably the construction described will be duplicated at the other end. A hub 74 is secured to a first end of shaft 64 and a hub 76 is secured to a second end of shaft 64. In the form shown, the interconnection is a threaded connection 80 with respect to hub 74 with a similar connection (not shown) being effected at the other end. Other suitable means of connection, such as a press fit and pinned connection, or a chemically bonded connection, could be employed. An annular housing 84 has a portion 88 extending generally radially inwardly and a portion 90 extending generally axially. The annular housing defines a recess 96 within which is received an axial portion of the shaft 64, a portion of the annular hub 80 and a bearing 100. The bearing 100 has an inner race 102 fixedly secured to the shaft and abutting a projection 104 of hub 74. The bearing outer race 106 is secured to portion 90 of the housing 84. It will be appreciated, therefore, that the bearing 100 permits relative rotation of the roller 68 axially about fixed shaft 64.

A passageway 110 has an initial axial portion and a connecting radial portion 112 in order to facilitate delivery of lubricant to the roller bearing 100. If desired, a plurality of radial portions 112 could be employed. The annular co-injected seal 120 of the present invention preferably has an annular first labyrinth seal portion 124 and a resilient annular contact or wiping seal portion 126 which have been formed by co-injection as a unitary structure. The first labyrinth seal portion 124 cooperates with a portion 130 of the hub 180 to create a labyrinth seal. In the form shown, the first labyrinth seal portion 124, in the form shown, has a body portion 140 which cooperates with a flange 122. The body portion has an extension 142 and a plurality of relatively spaced ribs 146, 150 which cooperate to define a pair of recesses 160, 162. In the form shown, the contact seal 126 is integrally formed with and has a portion 125 in surface-to-surface engagement with the extension 142 and has a projecting portion which is at 127.

The first labyrinth seal portion 124 is preferably composed of a material more rigid than the contact seal portion 126 with the contact seal 126 being composed of a resiliently deformable material. The contact seal 126 will be integrally formed with the labyrinth seal portion 124. It is preferred that the contact seal portion will be composed of a softer material than the first labyrinth seal portion. Among the suitable materials for use in the contact seal portion are materials selected from the group consisting of thermoplastic urethane (TPU), styrene acrylonitrile (SAN), ultrahigh molecular weight polyethylene (UHMWPE), high density polyethylene (HDPE), rubber and rubber compounds. Among the materials suitable for use in the first labyrinth seal portion are materials selected from the group consisting of polyamids, such as nylon, for example, acrylonitrile butadiene styrene (ABS), and polycarbonate/acrylonitrile butadiene styrene (PC/ABS) in selecting materials for each seal portion, the objective of having the first labyrinth seal portion more rigid than the contact seal portion should be taken into consideration.

The hub 74 is preferably formed from a rigid material such as metal. The hub 74 has an annular generally tubular portion 172 and a generally radially projecting portion 130 from which a plurality of fins 170, 176 project. It will be appreciated from FIG. 3 that the fins 170, 176 extend respectively into recesses 162, 160, respectively, of annular seal 120 of FIGS. 2 and 3 with the contact seal 126 being shown in its undeformed shape wherein it has a generally L-shaped configuration which is secured to an outer radial portion 142 of the first labyrinth seal portion 124. A first leg 125 is integrally formed with the first labyrinth seal portion 124 and a second leg 127 is structured to be deformed when engaged by a portion of the hub 74 such as contact area 190 shown in FIG. 3.

Figure 6:
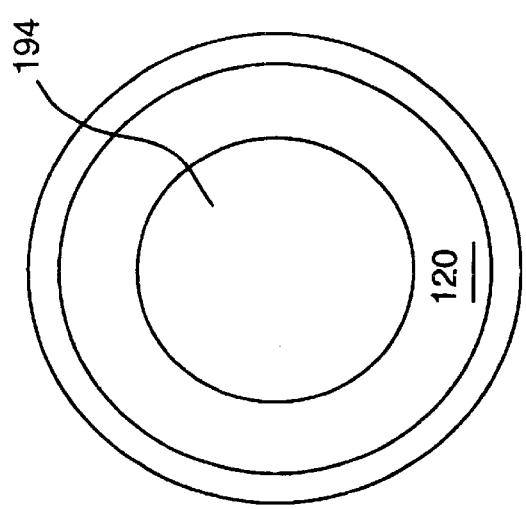
FIG. 6 is the rear elevational view of the seal of FIG. 4.
Figure 5:
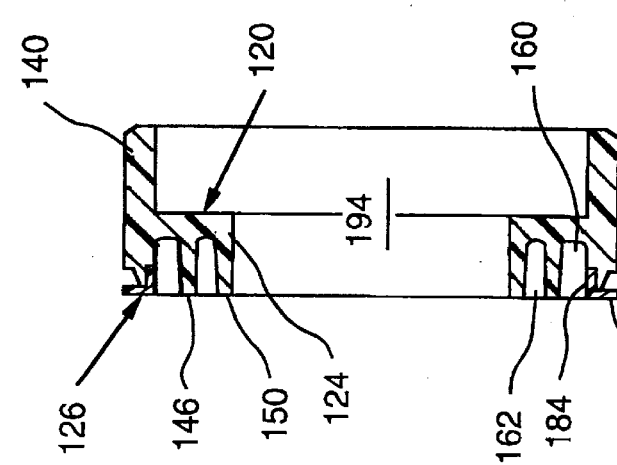
FIG. 5 is a cross-sectional illustration of a seal of the invention taken through 5—5 of FIG. 4.
Figure 4:
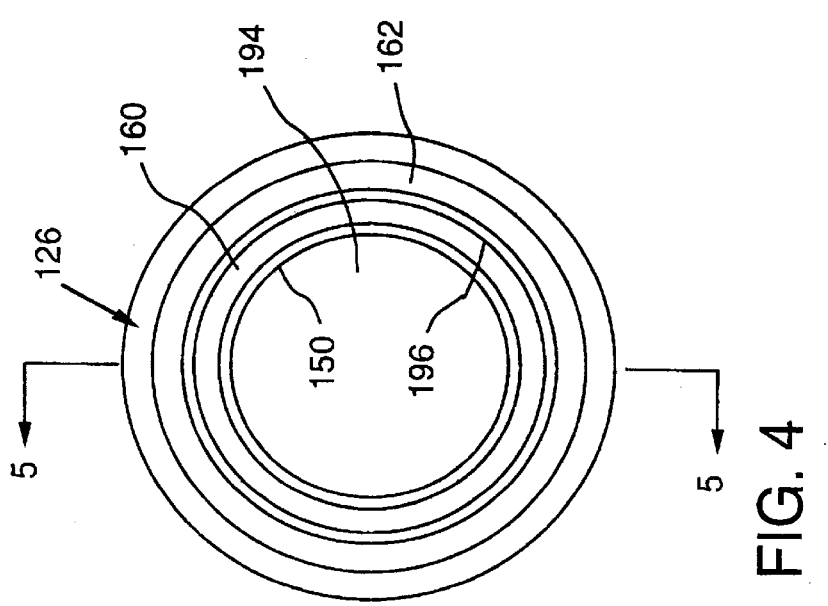
FIG. 4 is a front elevational view of an embodiment of the co-injected annular seal of the present invention.
Figure 7:
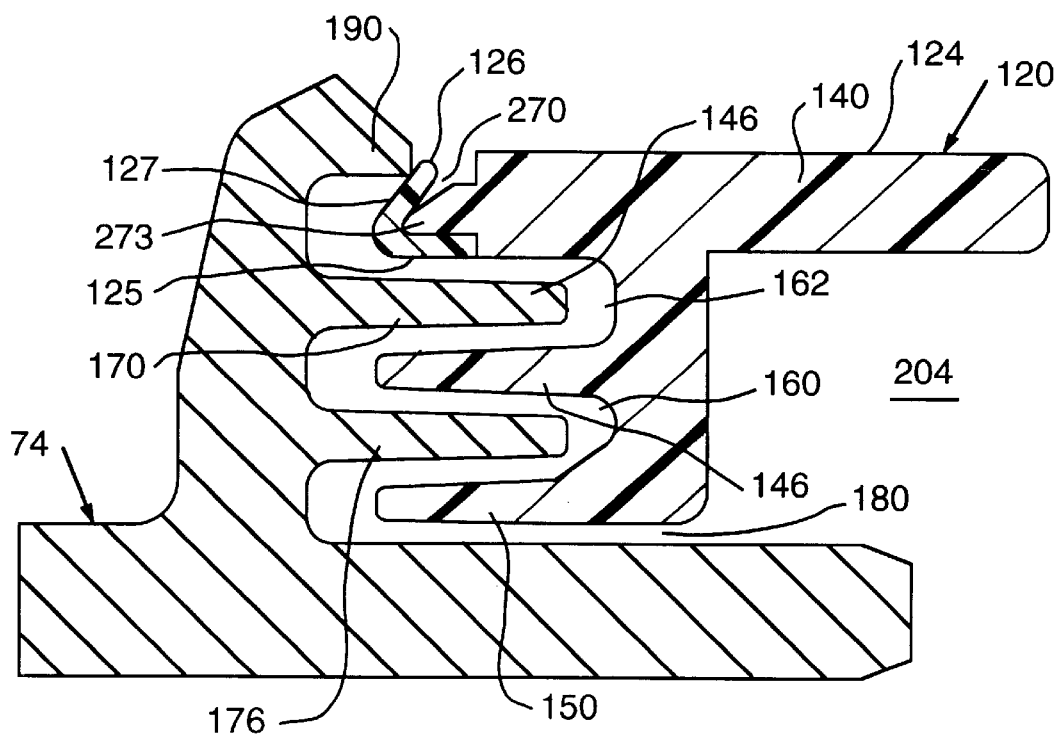
FIG. 7 is a cross-sectional illustration showing the labyrinth seal components and contact seal of the present invention.
Figure 8:
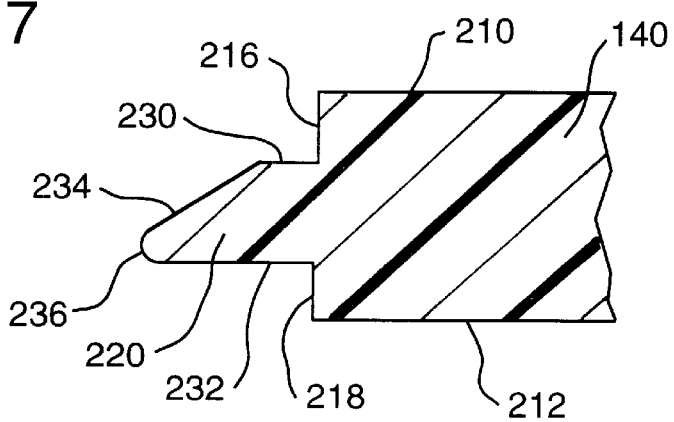
FIG. 8 is a fragmentary cross-sectional illustration showing a portion of a first labyrinth seal component of the present invention.
Figure 9:
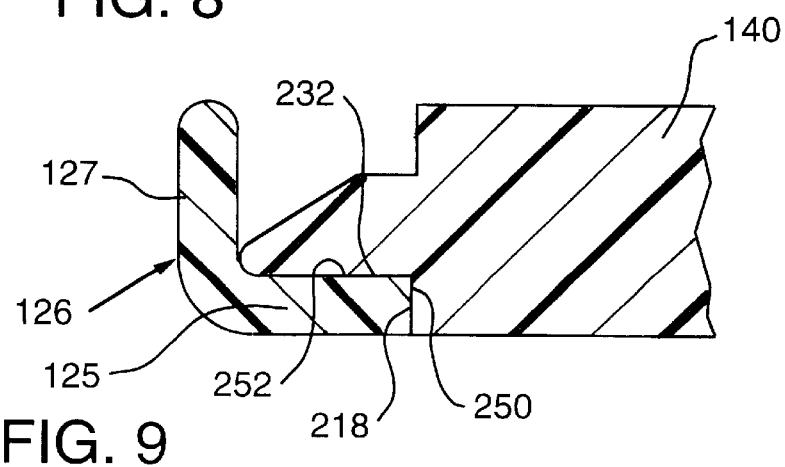
FIG. 9 shows the a cross-sectional illustration of the component of FIG. 8 with a contact seal formed therewith.

The annular seal as shown in FIGS. 4–6 preferably has a substantially uniform cross-sectional configuration throughout its circumferential extent and has a central opening 194. Referring in greater detail to FIGS. 7–9 there is shown a portion of the hub 74 with the threads omitted, the first labyrinth seal portion 120, the wiper or contact seal portion 126, the labyrinth passageway 180 which is open to the chamber 204 within which the bearing (not shown) is disposed. As shown in FIGS. 8 and 9, a portion of the extension 142 of the first labyrinth seal portion 124 has parallel upper and lower surfaces 210, 212 shoulder portions 216, 218, a projection 220 having a pair of generally parallel upper and lower surfaces 230, 232, an angularly oriented forwardly extending surface 234 and an outwardly convex transition surface 236. As shown in FIG. 9, the uncompressed annular contact seal 126 is formed with the extension 142 such that a surface 250 is secured to surface 218 and a surface 252 is secured to surface 232.

Leg 125 of the contact seal 126 is generally immovable with respect to the first labyrinth seal forming portion 124 and its extension 142 while leg 127 is resiliently deformable when contacted by hub portion 190. It will be appreciated as shown in FIG. 7 that in this sealed arrangement a recess 270 remains between the contact seal 126 and portion 272 of the first labyrinth seal portion. It will be appreciated that the labyrinth seal 126 serves to seal the labyrinth passageway 180.

It will also be appreciated that in the embodiment of FIGS. 2 through 9 the sealing effected between the contact seal 126 and the hub 74 occurs at a radially outwardly portion of the annular seal 120.

With reference to FIGS. 2 through 9, the first labyrinth seal portion and the resiliently deformable contact seal permit the purging of contaminants, when desired, by means of grease flowing to the outside of the seal through the labyrinth and contact seal portions. The same is true of the embodiments of FIGS. 14 through 24.

Figure 11:
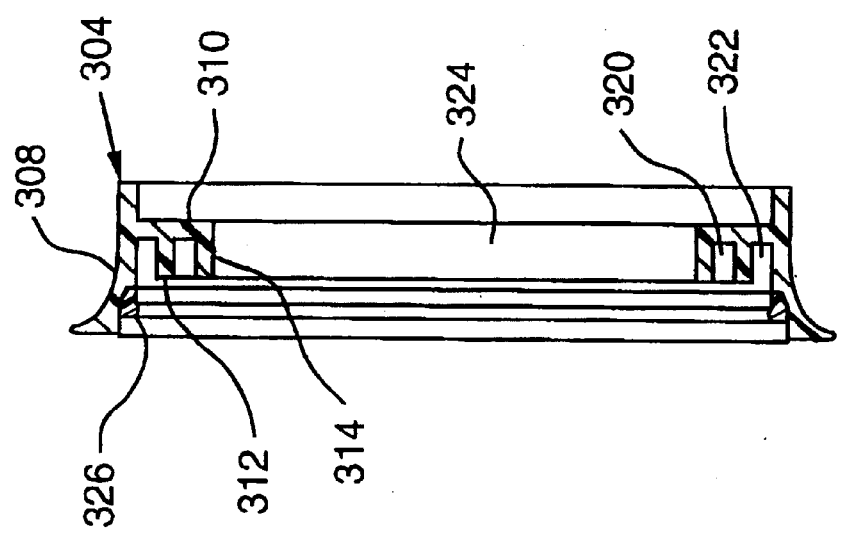
FIG. 11 is a cross-sectional view of the seal of FIG. 10 taken through 11—11.
Figure 10:
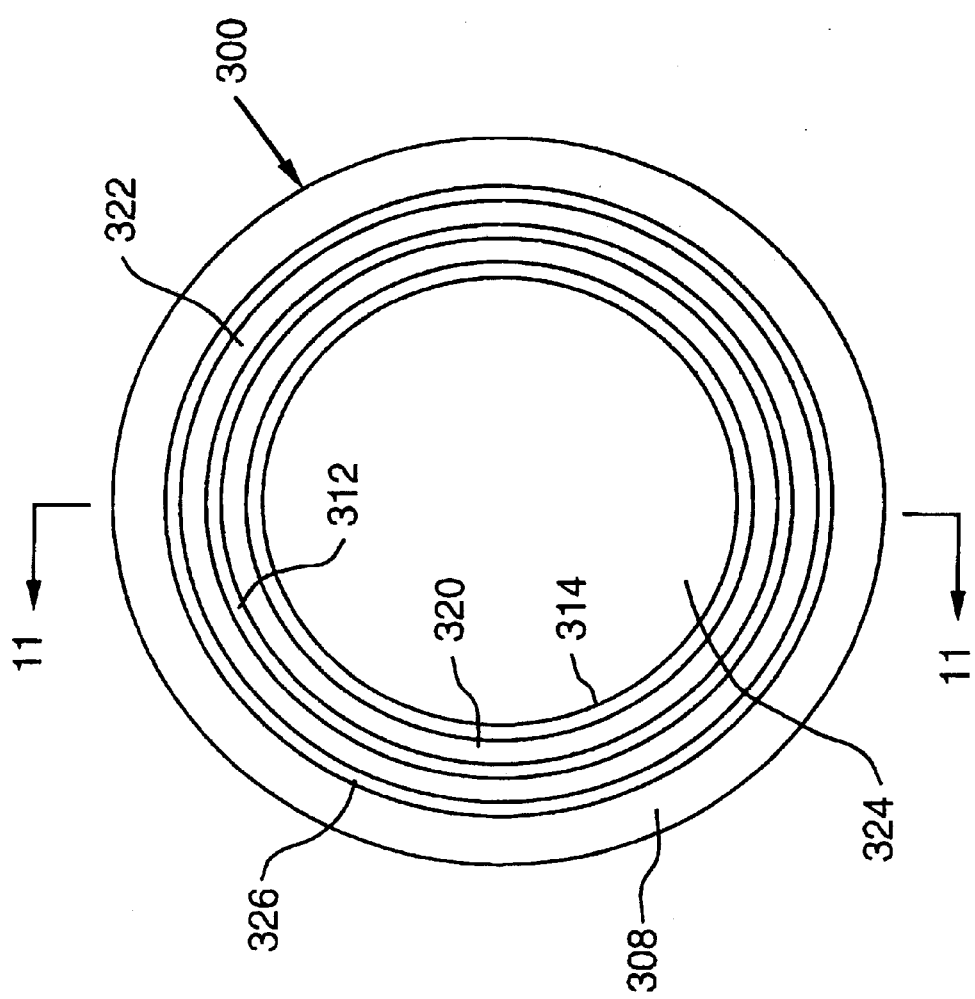
FIG. 10 is a front elevational view of another embodiment of an annular seal of the present invention.

Referring to FIGS. 10 through 13, another embodiment of an annular seal having a contact seal disposed at a radially outwardly disposed position will be considered. A co-injected unitary annular seal 300, as shown in FIGS. 10 and 11, has a first labyrinth seal portion 304 which is provided with a body portion 308, an annular flange 310, a pair of projecting walls 312, 314, all of which cooperate to define recesses 320, 322 and has a central opening 324. Co-injected with and integrally formed as a unit with the first labyrinth seal portion 304 is an annular contact seal 326.

Figure 12:
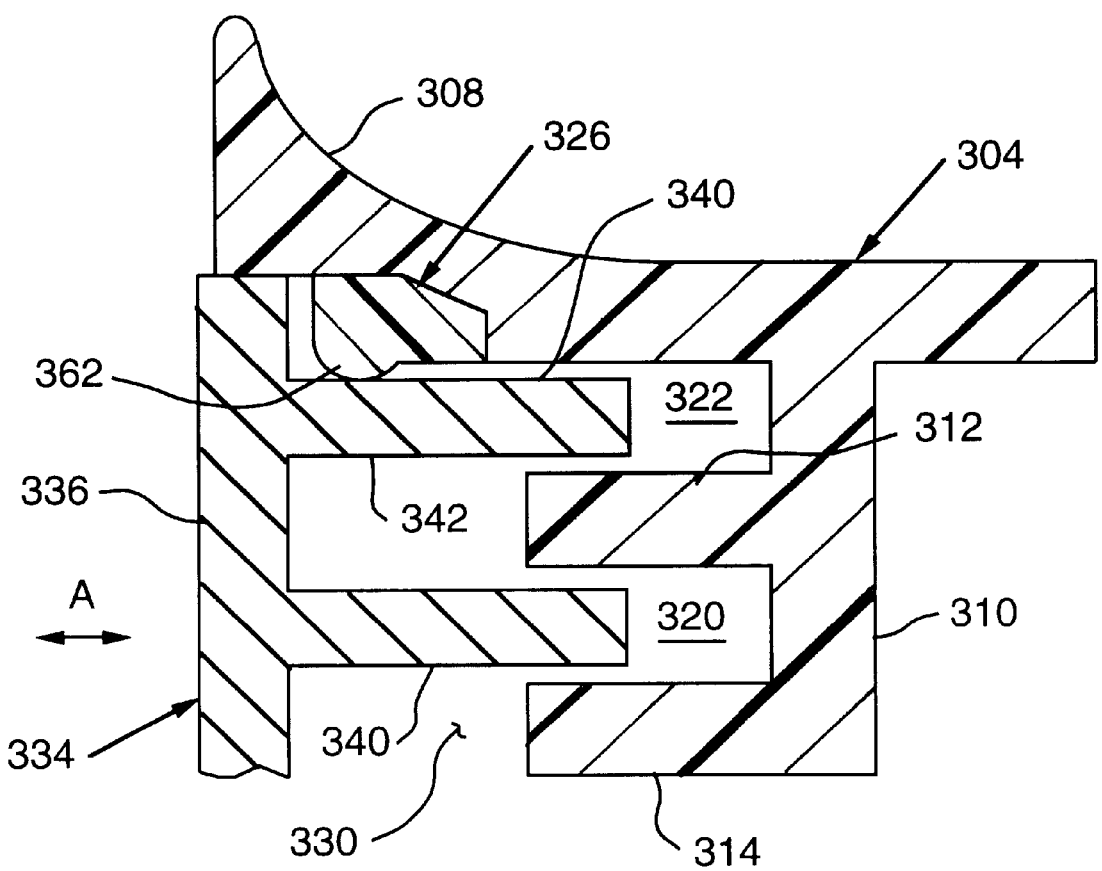
FIG. 12 is a detailed cross-sectional illustration of a labyrinth seal employing the annular seal of FIGS. 10 and 11.
Figure 13:
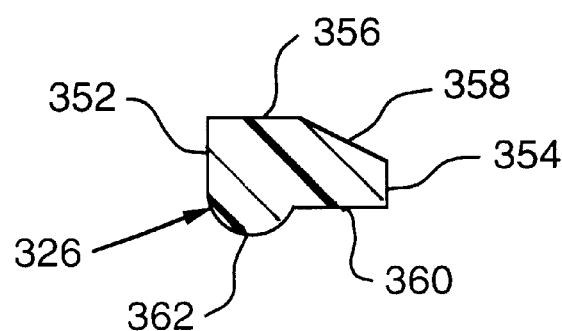
FIG. 13 is a detailed cross-sectional illustration of the contact seal portion of the annular seal of FIGS. 11 and 12.

Referring in greater detail to FIGS. 12 and 13, a labyrinth path 330 is defined between the first labyrinth seal portion 304 and the portion 334 of the hub shown in FIG. 12. The hub portion 334 has a generally radially oriented section 336 and a pair of projecting annular portions 340, 342 which respectively extend into recesses 320, 322 to define the labyrinth passageway 330. Contact seal 326 is shown as secured to the undersurface of portion 308 of the first labyrinth seal portion 304 and sealingly engaging upper surface 340 of hub projection 342.

In the embodiments of FIGS. 12 and 13, the contact seal 326 has an upper surface 350, a first lateral surface 352 and a second lateral surface 354 generally parallel thereto. An angularly radially inwardly sloping surface 358 connects surfaces 350, 352. A downwardly projecting annular rib 362 which, in the form shown, is hemispherical in cross-sectional shape effects sealing engagement with the projection 342 of the hub 334. It will be appreciated that relative sliding movement of the hub 334 in either direction shown by arrow A will result in the passageway 330 being sealed as the contact between rib 362 and upper surface 340 will be maintained.

In lubricating the bearing, grease can enter the cavity either above or below the bearing and flow through the labyrinth and past the contact seal. The contact seal can be on either the inner ring or outer ring.

Figure 16:
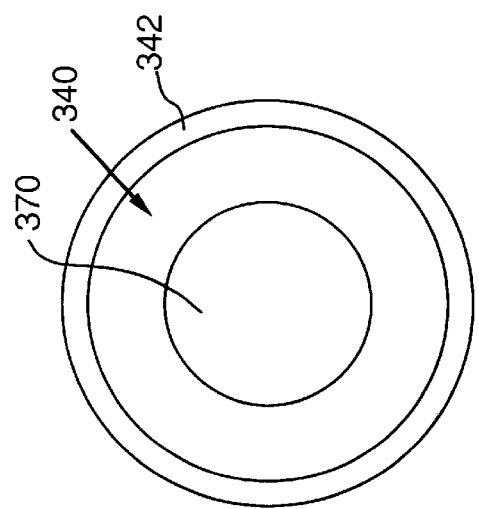
FIG. 16 is a rear elevational view of the seal of FIG. 14.
Figure 15:
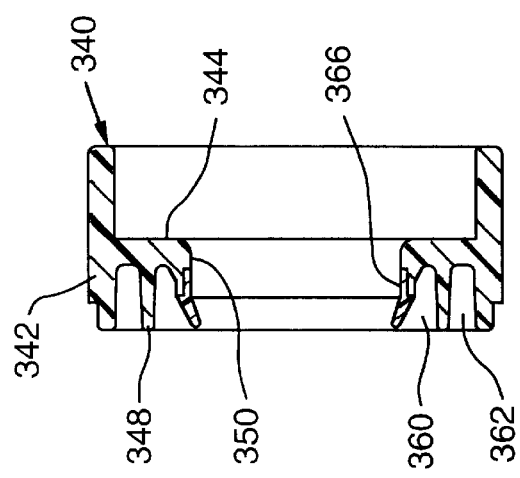
FIG. 15 is a cross-sectional view of the seal of FIG. 14 taken through 15—15.
Figure 14:
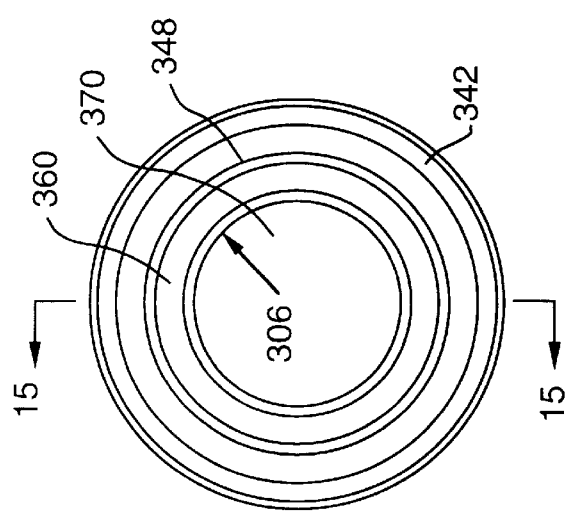
FIG. 14 is a front elevational view of another embodiment of the co-injected annular seal of the present invention.

Referring to FIGS. 14–18, another embodiment of the annular co-injected seal of the present invention will be considered. As shown in FIGS. 14–16, the annular seal has a first labyrinth seal portion 340 which includes a body section 342, an annular flange 344, a pair of projecting annular walls 348, 350 and recesses 360, 362. In this embodiment of the invention, the wiper or contact seal portion 366 is disposed on a radially inward portion of the annular co-injected seal. A central opening 370 is provided. In this embodiment, the contact seal 366 cooperates with projecting wall 350 to define annular recess 360.

With the contact seal on the outermost ring as in FIGS. 2–9, the seal will resist contaminants from entering the labyrinth and equalize grease pressure around the first labyrinth during re-greasing. With the contact seal on the innermost ring, as in FIGS. 14 through 23, the contact seal resists contaminants that have gotten through the labyrinth from getting to the bearing.

Figure 17:
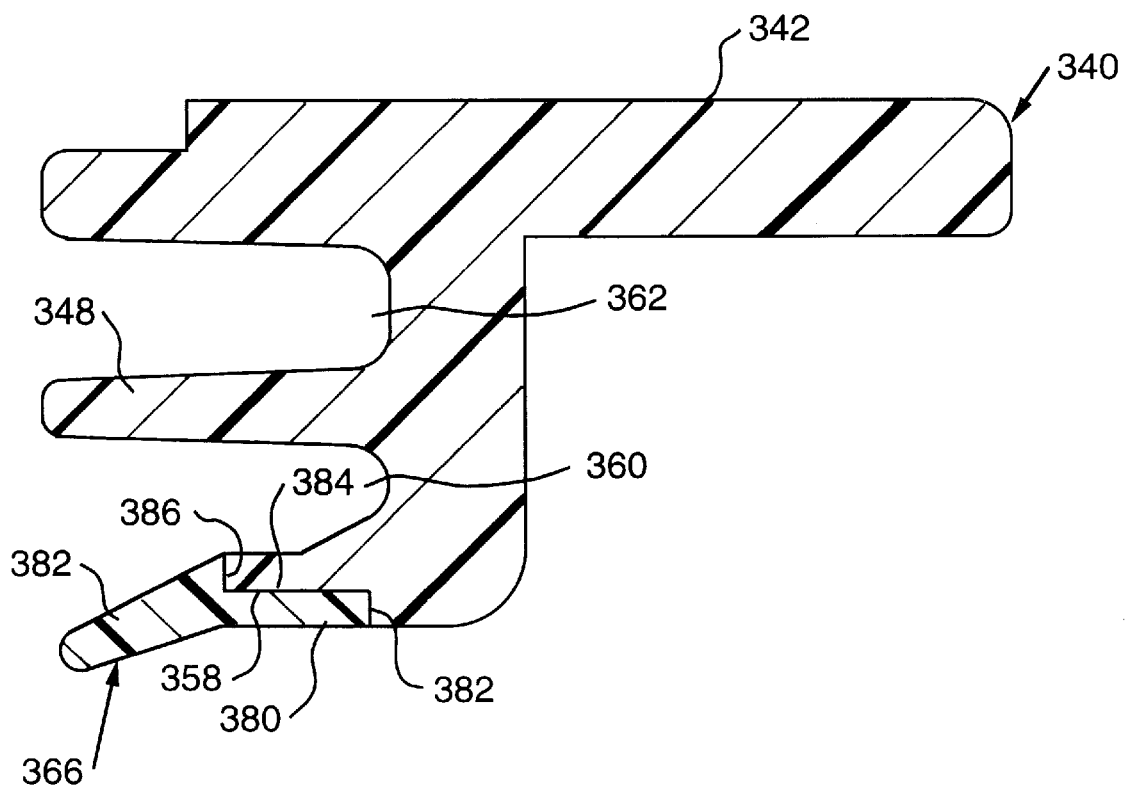
FIGS. 17 and 18 are cross-sectional illustrations showing a detail of the first labyrinth seal portion and contact seal portion of FIGS. 14–16.
Figure 18:
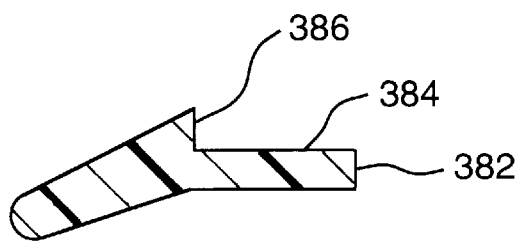

Referring with greater specificity the FIGS. 17 and 18, it will be seen that a first portion 380 of the contact seal 366 is formed in surface-to-surface contact with portion 358 of the first labyrinth seal portion 340. Surface-to-surface contact exists along surfaces 382, 384, 386 of the contact seal 366. Projecting portion 382 of contact seal 366 is resiliently deformable.

Figure 19:
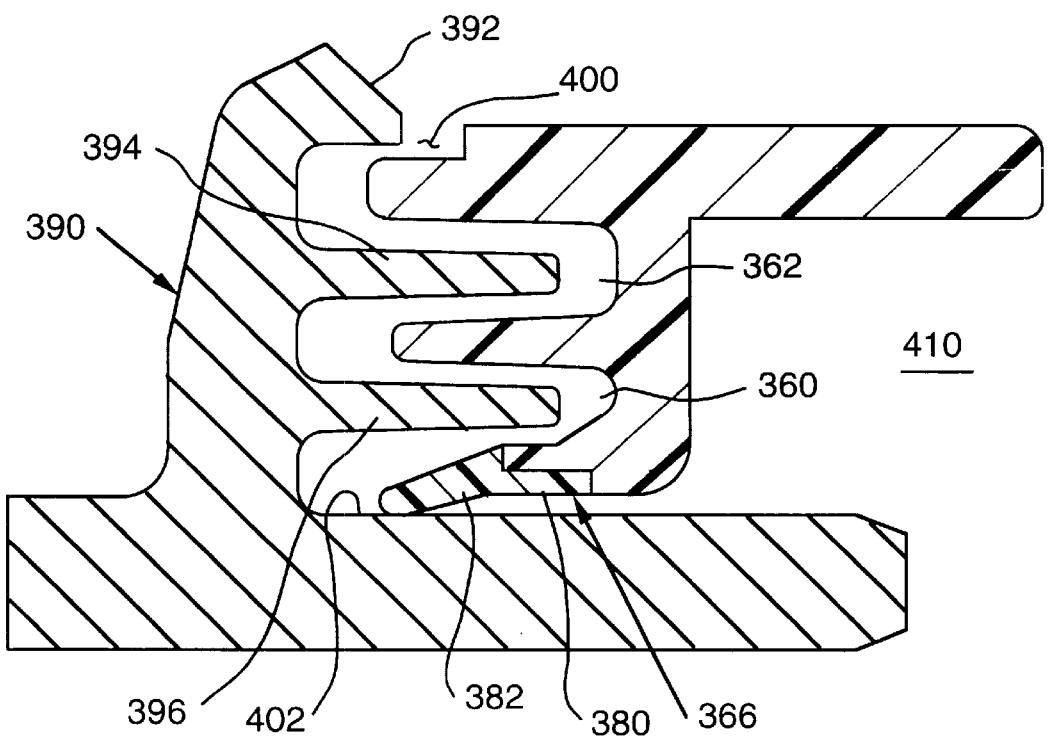
FIG. 19 is a cross-sectional illustration showing the annular seal of FIGS. 14 through 18 cooperating with a second labyrinth seal portion to define a labyrinth seal.

FIG. 19 shows the seal of FIGS. 14–18 positioned adjacent to hub 390. The hub 390 has projecting portions 392, 394, 396 with projections 394, 396 extending into recesses 362, 360, respectively. It will be appreciated that the labyrinth passageway 400 is sealed at its innermost portion by the contact seal portion 366 engaging surface 402 of the hub 390. The bearing (not shown) will be positioned in chamber 410.

Figure 20:
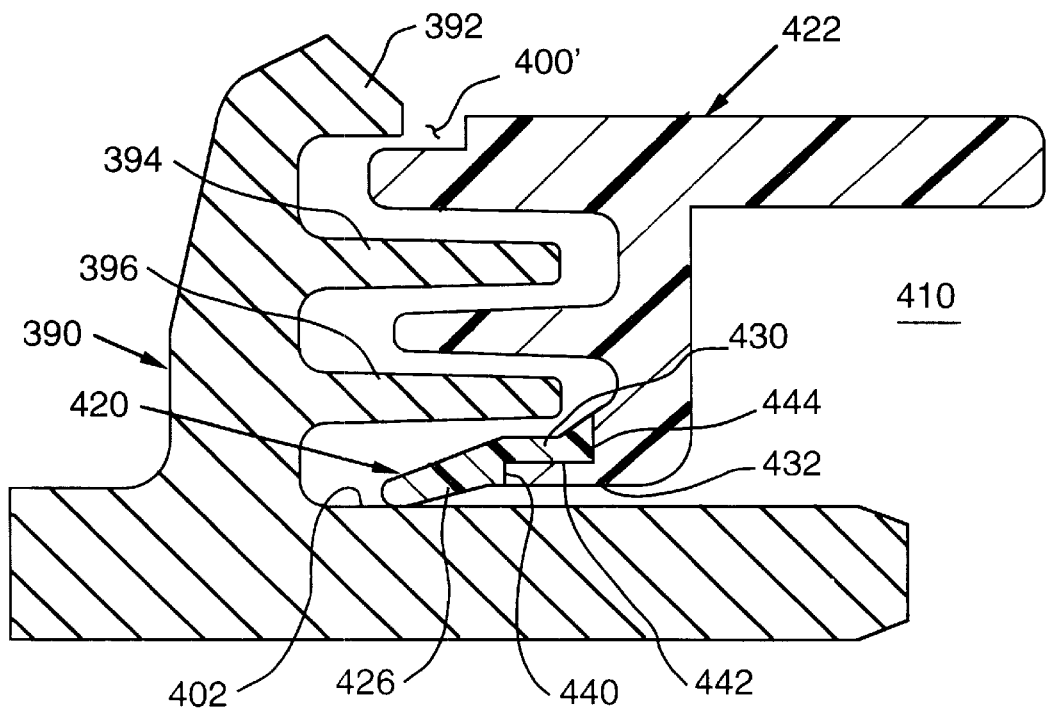
FIG. 20 is a cross-sectional illustration showing a labyrinth seal with a modified co-injected contact seal.

FIG. 20 shows a unitary co-injected seal similar to that of FIG. 19, but with the securement of the contact seal 420 being effected in a different position. In the unitary annular seal created by co-injection of the first labyrinth seal portion 422 and the contact seal 420 the resiliently deformable portion 426 of contact seal portion 420 seals against upper surface 402 of the hub 390. The portion 430 of the contact seal 420 which is secured to the first labyrinth seal portion 422 overlies segment 432 thereof and has surface-to-surface contact along surfaces 440, 442 and 444 of the contact seal 420.

Figure 22:
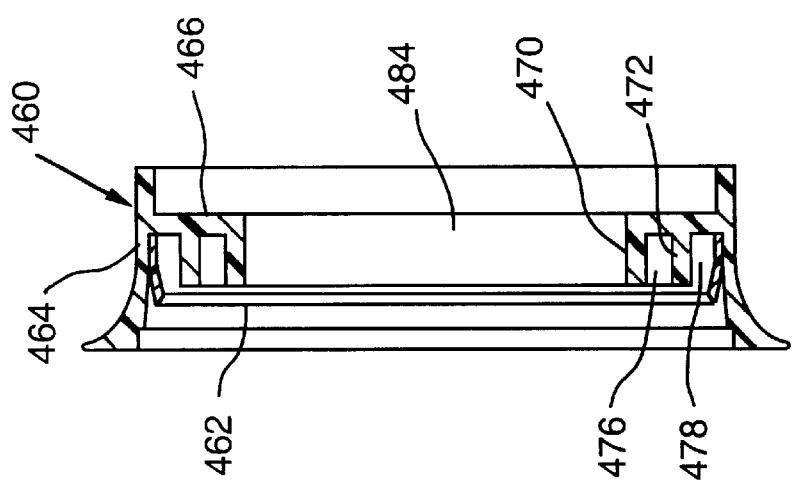
FIG. 22 is a cross-sectional illustration of the annular seal of FIG. 21 taken through 22—22.
Figure 21:
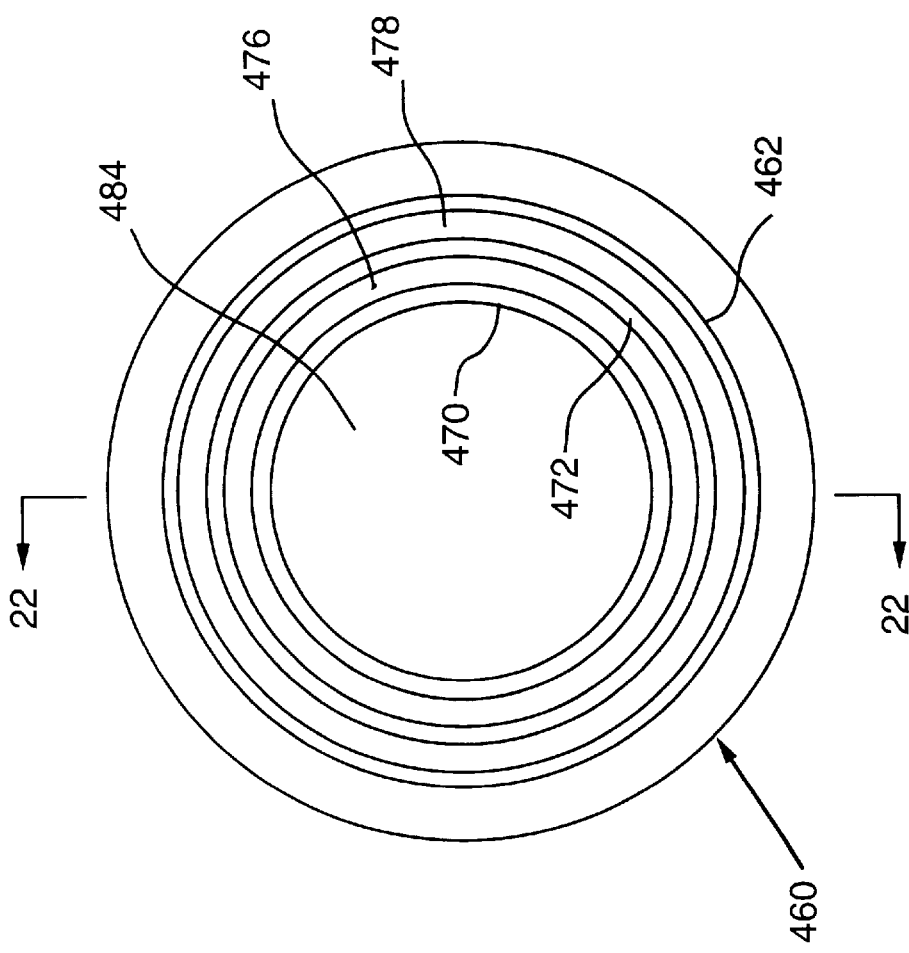
FIG. 21 is a front elevational view of another embodiment of the co-injected annular seal of the present invention.
Figure 23:
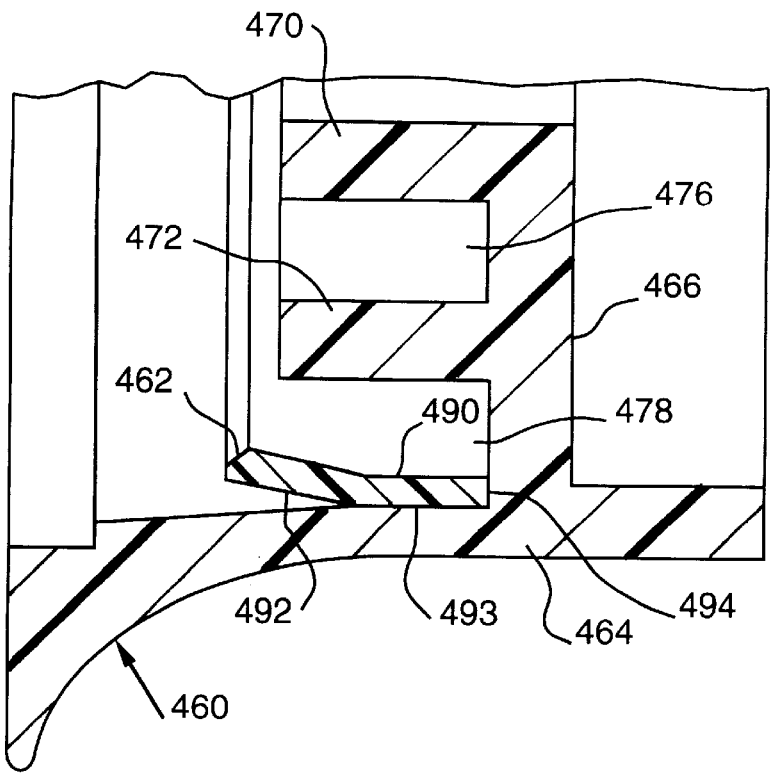
FIG. 23 is an enlarged cross-sectional illustration showing a portion of the annular seal of FIGS. 21 and 22.

In the embodiment of FIGS. 21–23, the first labyrinth seal portion 460 is connected to the contact seal portion 462 with the seal being connected at a radially outer portion of the first labyrinth seal portion 460. The first labyrinth seal portion 460 has a radially outer portion 464, a flange 466 which cooperates with projecting walls 470, 472 to define recesses 476, 478. A central opening in the annular die is provided at 484. The annular contact seal portion 462 has a first portion 490 connected to the first labyrinth seal portion at surface 492 and surface 494. These annular connections are part of the co-injection process in creating the unitary co-injected mold having at least two different materials. Section 492 of the annular contact seal portion 462 is resiliently movable. A free end or a surface of section 492 may seal against a hub portion to seal and unseal the labyrinth passageway.

Figure 24:
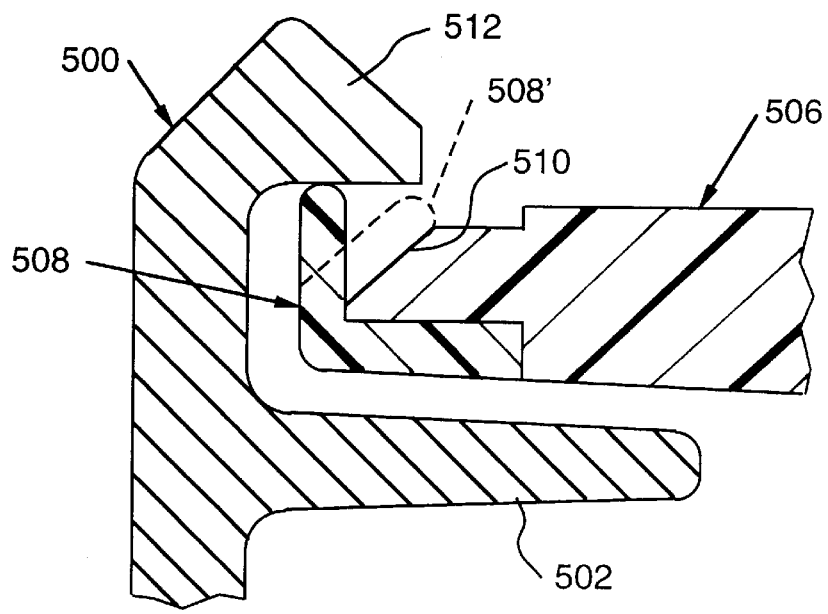
FIG. 24 is a fragmentary cross-sectional illustration illustrating flexing of the contact seal portion of a unitary co-injected annular seal of the present invention.

Referring to FIG. 24, there is shown a hub portion 500 which may be similar to that shown in FIGS. 2 and 3 and have a projection 502. The first labyrinth seal portion 506 has a sloping wall 510 which receives the deformed contact seal portion 508' which has been deformed under the influence of portion 512 of hub 500.

It will be appreciated, therefore, that the present invention provides a unitary co-injected annular seal for idler rollers having at least two sections composed of different materials. It provides a first labyrinth seal portion which is of a more rigid material and a contact seal portion which is more resiliently compressible and resiliently deformable than the first labyrinth seal portion. The unitary seal is adapted to be employed in conventional, as well as specially designed idler roller constructions to function as a seal for the labyrinth passageway.

While for simplicity of disclosure herein, reference has been made to the use of two different materials in the unitary co-injected annular seal, it will be appreciated that, if desired, more than two materials can be employed with material selection and relative positioning being dependent upon the end use objectives. The seal may be employed with a wide variety of types of bearings, such as roller or ball bearings, for example.

Whereas particular embodiments of the invention have been described herein for purposes of illustration, it will be evident to those skilled in the art that numerous variations of the details may be made without departing from the invention as defined in the appended claims.

What is claimed is:

1. An idler roller assembly for a belt conveyor comprising
   a fixed shaft,
   a roller mounted for rotation about said shaft,
   a housing mounted at an end of said roller for rotation therewith,
   said shaft having a hub portion secured adjacent said end thereof and disposed adjacent said housing,
   a bearing having an inner race secured to said shaft and an outer race secured to said housing, and
   a unitary co-injected annular seal having a first labyrinth seal portion and a contact seal portion composed of a different material than said first labyrinth seal portion.
2. The idler roller assembly of claim 1 including
   said first labyrinth seal portion being composed of a more rigid material than said contact seal portion.
3. The idler roller assembly of claim 2 including
   said contact seal portion being resiliently deformable.
4. The idler roller assembly of claim 3 including
   said first labyrinth seal portion being structured to cooperate with a second labyrinth seal portion to define a labyrinth seal.
5. The idler roller assembly of claim 4 including
   said first labyrinth seal portion being secured to said housing, and
   said second labyrinth seal portion being formed within said hub.
6. The idler roller assembly of claim 4 including
   said first labyrinth seal portion being substantially rigid.
7. The idler roller assembly of claim 6 including
   said annular seal being disposed between said hub and said bearing.
8. The idler roller assembly of claim 7 including
   said first labyrinth seal portion having a plurality of projecting elements defining annular recesses therebetween.
9. The idler roller assembly of claim 8 including
   said second labyrinth seal portion having annular projecting portions extending into said recesses in said first labyrinth seal portion.
10. The idler roller assembly of claim 9 including
    said contact seal portion being secured to a radially outwardly disposed annular projection of said first labyrinth seal portion.
11. The idler roller assembly of claim 10 including
    said contact seal portion being structured to seal against a portion of said hub.
12. The idler roller assembly of claim 11 including
    said contact seal portion being generally L-shaped in cross-section in its undeformed state.
13. The idler roller assembly of claim 9 including
    said contact seal portion being formed on a radially inwardly disposed portion of said first labyrinth seal portion.
14. The idler roller assembly of claim 9 including
    said second labyrinth seal portion being composed of metal.
15. The idler roller assembly of claim 14 including
    said contact seal portion partially defining a portion of a said recess in a said first labyrinth seal portion.
16. The idler roller assembly of claim 1 including
    said contact seal portion being deformable to facilitate introduction of lubricant into said labyrinth seal.
17. The idler roller assembly of claim 1 including
    said first labyrinth seal portion being composed of a material selected from the group consisting of polyamids, such as nylon, for example, acrylonitrile butadiene styrene (ABS), and polycarbonate/ acrylonitrile butadiene styrene (PC/ABS).
18. The idler roller assembly of claim 17 including
    said contact seal portion being composed of a material selected from the group consisting of thermoplastic urethane (TPU), styrene acrylonitrile (SAN), ultra-high molecular weight polyethylene (UHMWPE), high density polyethylene (HDPE), rubber and rubber compounds.
19. The idler roller assembly of claim 8 including
    said first labyrinth seal portion having at least two said annular recesses,
    said second labyrinth seal portion having a pair of spaced annular projections extending into said recesses while providing a labyrinth passageway, and
    said contact seal portion being structured in its undeformed state to seal said labyrinth passageway.
20. The idler roller assembly of claim 19 including
    said contact seal portion sealing against a radially inwardly disposed portion of said hub.
21. The idler roller assembly of claim 19 including
    said contact seal portion sealing against a radially outwardly disposed portion of said hub.
22. The idler roller assembly of claim 1 including
    a said housing disposed at each end of said roller with a said hub portion, a said bearing and a said unitary co-injected annular seal associated with each said housing.
23. The idler roller assembly of claim 19 including
    said first labyrinth seal portion recesses being open in a direction generally facing said hub.

* * * * *

UNITED STATES PATENT AND TRADEMARK OFFICE
CERTIFICATE OF CORRECTION

PATENT NO. : 6,206,182 B1  
DATED : March 27, 2001  
INVENTOR(S) : Craig M. Wilson et al.

Page 1 of 1

It is certified that error appears in the above-identified patent and that said Letters Patent is hereby corrected as shown below:

<u>Title page,</u>  
Lines 3-4, "BACKGROUND OF THE INVENTION" should be deleted fom the title of the invention.

<u>Column 1,</u>  
Lines 3-4, "BACKGROUND OF THE INVENTION" should be deleted from the title of the invention.

Signed and Sealed this

Twenty-sixth Day of March, 2002

Attest:

*Attesting Officer*

JAMES E. ROGAN  
*Director of the United States Patent and Trademark Office*